United States Patent [19]

Pannier

[11] Patent Number: 4,873,606
[45] Date of Patent: Oct. 10, 1989

[54] SAFETY CONTROL DEVICE FOR AN ACTUATOR OF THE FLAP SOLENOID VALVE TYPE

[75] Inventor: Gerard Pannier, Villiers-Saint-Frederic, France

[73] Assignee: Regie Nationale des Usines Renault, Boulogne Billancourt, France

[21] Appl. No.: 209,968

[22] Filed: Jun. 22, 1988

[30] Foreign Application Priority Data

Jun. 22, 1987 [FR] France .............................. 87 08744

[51] Int. Cl.⁴ .......................................... H01H 47/00
[52] U.S. Cl. .................................... 361/152; 361/196; 361/195; 361/187; 361/154; 361/160; 361/170
[58] Field of Search ............... 361/139, 152, 154, 170, 361/187, 195, 196, 197, 198, 160

[56] References Cited

U.S. PATENT DOCUMENTS

| | | | |
|---|---|---|---|
| 4,266,261 | 5/1981 | Streit et al. | 361/154 |
| 4,328,526 | 5/1982 | Dilger et al. | 361/154 |
| 4,446,410 | 5/1984 | Yagura et al. | 361/152 |
| 4,628,885 | 12/1986 | Ogburn et al. | 361/152 |
| 4,680,877 | 7/1987 | Petrie | 361/154 |
| 4,729,056 | 3/1988 | Edwards et al. | 361/154 |

Primary Examiner—A. D. Pellinen
Assistant Examiner—H. L. Williams
Attorney, Agent, or Firm—Oblon, Spivak, McClelland, Maier & Neustadt

[57] ABSTRACT

A safety control device for an actuator of a flap solenoid valve, such as for an automatic transmission. The device includes a current control device which is connected to a shunt resistor for measuring the current through the solenoid valve and the current control device. It also includes a control package which measures the time between the starting of the power to the solenoid valve and the moment when the current reaches a threshold intensity. The control package compares this time with a time range which indicates the proper operation of the solenoid valve so that if the time falls outside this time range, the control package instructs the current control device to cut power to the solenoid valve.

7 Claims, 1 Drawing Sheet

SAFETY CONTROL DEVICE FOR AN ACTUATOR OF THE FLAP SOLENOID VALVE TYPE

BACKGROUND OF THE INVENTION

1. Field of the Invention

This invention relates generally to a safety control device for actuators of the flap solenoid valve type and more particularly to a safety control device for actuators of a flap solenoid valve used in automatic transmissions.

2. Discussion of the Background

For several years, electronic control systems have been used for the injection of gas or diesel fuel, for automatic transmissions, for the brake elements, for steering elements, and for suspension elements using, electrohydraulic actuators, flap solenoid valves of the fuel injector type or of the pressure modulator type, for example. Very generally, these actuators are of the solenoid type and exhibit the feature of having a hydraulic channel which can be opened or closed very quickly a very large number of times without functional degradation for the service life of the product. The electromagnetic force developed by the solenoid in the magnetic circuit of the actuator allows the closing or opening of the hydraulic channel by moving a mobile unit which can consist either directly of a solenoid plunger, a ball, a plate, etc. which is in the magnetic flux, or indirectly of a hydraulic slide magnetically insulated from the actuator but actuated by a solenoid plunger, a ball, a plate, etc. which is in the magnetic flux. When the solenoid is not supplied with power, the force exerted by the pressure of the fluid itself and/or by the action of a spring inversely causes the opening or closing of the hydraulic channel.

Very generally, the resistance of the solenoid is selected to be as low as possible in order to reduce as much as possible the time of movement of the mobile unit which disturbs the functional response of the actuator. This arrangement increases the rise and fall of the current in the solenoid upon the appearance of the activation or deactivation order to cause the electromagnetic force to rise or fall more quickly.

In order to reduce the energy dissipated by the actuator when the mobile unit is held at the end of its travel and when the current which passes through the solenoid reaches a so-called "call" value, the current is reduced and maintained only by a limitation electronic device at a so-called "maintaining" value.

It is clear that any electric anomaly, such as shortcircuit, open circuit, abnormal resistance which affects the operation of such an actuator, can have very harmful consequences on the good operation of the element controlled, on its mechanical strength and even on the safety of the occupants of the vehicle. Known monitoring and cutoff devices associated with flap solenoid valves described above are ineffective to solve this problem. Actually, these device are generally designed so that the monitoring of the electrical operation of the solenoid valve is done by a measurement of the intensity of the current passing through the solenoid and/or the voltage present either directly at its terminals, or at the terminals of the controlling electric switching element placed in series with the solenoid valve and by comparative and synchronous analysis of the values measured in relation to known patterns representing the various combinations possible during good or poor operations of the device. In the case of flap solenoid valves, the values of the intensity of the current passing through the solenoid and the voltage at its terminals or at the terminals of the switching element are essentially variable over time, particularly because of the action of the limitation system of the current and, consequently, cannot be compared simply with patterns established in advance. This makes such a method of diagnostics of an operational anomaly ineffective. The principle of insulation of the solenoid valve with respect to its electric connections generally is used by the cutting off of the circuit downstream from the solenoid valve by direct action on the switching element itself or, even better, by additional cutting off of the circuit upstream from the solenoid valve by action on an appropriate conductive/nonconductive device, so as to achieve a complete galvanic insulation of the 2 outlets of the solenoid valve to which it is desired to cut off the power supply.

SUMMARY OF THE INVENTION

The object of this invention, which is a safety control of a flap solenoid valve, is to measure the time needed for the intensity of the current to increase to a predetermined value by self-induction effect in the solenoid from the beginning of conduction.

This time is indicative of the good or poor electrical operation of the solenoid valve.

Another object of this invention is to provide a safety control which reduces the unnecessary dissipation of energy.

A further object of this invention is to provide a safety control which operates without harmful consequences due to electrical anomalies.

A still further object of this invention is to provide a safety control which provides a diagnosis of any electrical anomaly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Obviously, numerous (additional) modifications and variations of the present invention are possible in light of the above teachings. It is therefore to be understood that within the scope of the appended claims, the invention may be practiced otherwise than as specifically described herein.

Figure 1:
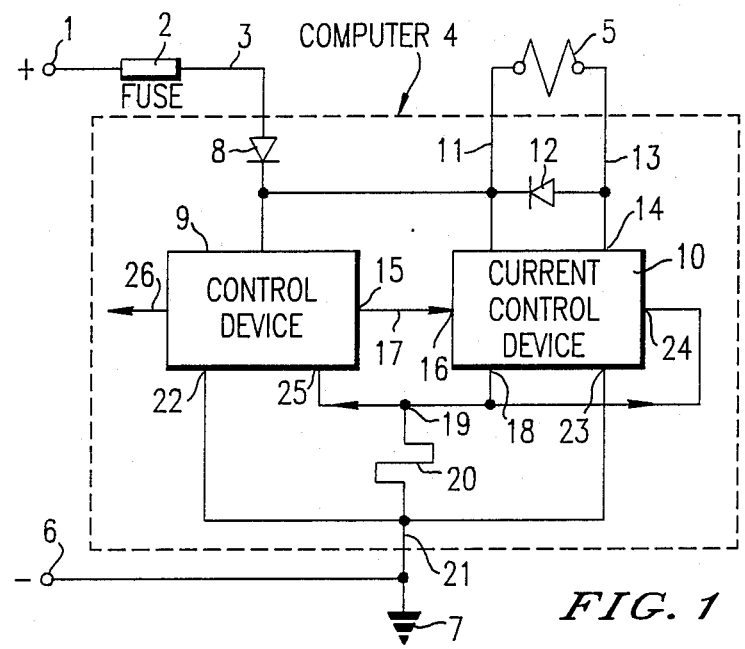
FIG. 1 is a schematic diagram of the present invention.

FIG. 1 which shows an embodiment of such a device including the positive power supply line of the vehicle 1, which is connected by fuse 2 to conductor 3 of the power supply circuit of computer 4 which controls solenoid valve 5. The negative power supply line 6 is also connected to ground 7. Positive power supply conductor 3 is connected by way of diode 8 to control device 9, to current control device 10, to solenoid valve 5 by way of conductor 11 and finally to the cathode of diode 12 whose anode returns by wire 13 to the other terminal of solenoid valve 5 as well as to power output 14 of current control device 10.

When control device 9 gives the activation order to current control device 10, which are connected to one another by terminals 15 and 16 and conductor 17, current passes from positive conductor 3 through diode 8 and conductor 11 to solenoid valve 5. The return current then passes through conductor 13, enters power terminal 14 of current control device 10 and leaves through terminal 18. It then enters terminal 19 of shunt resistor 20, passes through it and returns by conductor 21 to ground 7. Line 21 is also connected to terminal 22 of control device 9 and to terminal 23 of current control device 10 to connect them to ground 7. Terminal 19 of the shunt is connected to current control device 10 by terminal 24 and to control device 9 by terminal 25. A three logic-state output 26 from control device 9 provides the diagnostic signals of computer 4.

The role of fuse 2 is, among other things, to protect conductor 11 which carries the current from computer 4 to solenoid valve 5 which are generally located at two different places in the vehicle. In the case of an operating anomaly, this conductor can be the grounded and cause a shortcircuit of the power supply of the vehicle.

The role of diode 8 is to protect the entire computer 4 from the polarity inversions of the power supply of the vehicle.

The role of diode 12 is to protect current limitation device 10 from surge voltage developed by the self-induction effect of solenoid valve 5.

Figure 2:
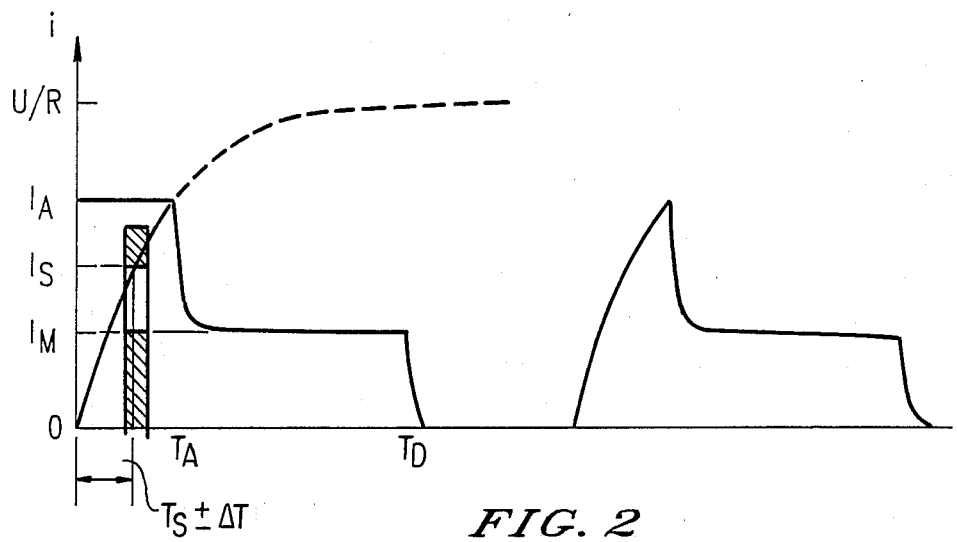
FIG. 2 is a graph showing the relationship between the current in the solenoid of FIG. 1 and time.

The operation of this embodiment will be better understood with reference to FIG. 2 which represents the waveform of the current circulating in solenoid valve 5. In particular, it is found that the current rises freely to a so-called "call intensity" value $I_A$. The current should reach the value U/R (U being the voltage at the terminals of solenoid valve 5 and R its resistance) if the activation time TA was very great with respect to the resistance-self-induction time constant of the solenoid valve. At value $I_A$, current limitation device 10 which exhibited a very slight voltage drop, goes into action and regulates the current at the so-called "maintaining intensity" value $I_M$ as long as the activation order from terminal 15 of control device 9, is maintained at input 16 (time TA of FIG. 2). When the deactivation order given by control device 9 appears, limitation device 10 is cut off to interrupt the current in solenoid valve 5 (time $T_D$ of FIG. 2). The cycle can then resume by a succession of times $T_A$ and $T_D$.

The principle of detecting an electrical operating anomaly of solenoid valve 5 or a continuity anomaly of connections 11 and 13 is to monitor the moment when the current, which increases in solenoid valve 5 during the activation phase $T_A$ of current limitation device 10, reaches the so-called "threshold intensity" value $I_S$ which is between 0 and call value $I_A$. To do this, the voltage present at the terminal of shunt resistor 20, through which the solenoid valve current passes, is sensed between terminals 25 and 22 of control device 9 so as to be compared with a voltage which is representative of the threshold intensity $I_S$. Control device 9 is, in particular, designed to measure the time which passes between the beginning of the activation time of the current in solenoid valve 5 and the moment when the current of the solenoid valve 5 reaches threshold value $I_S$. This time signal is sent to a time comparator which indicates whether this time falls between $T_S - \Delta T$ and $T_S + \Delta T$ which is the range of acceptable values of $I_S$, taking into account the possible tolerances or derivatives of operation.

An abnormal time, by connection 17, controls the opening of current limitation device 10 to cut off the current in solenoid valve 5 and sets the logic state of the diagnostic connection 26 to one of the three possible states corresponding to the operating anomaly detected.

Too short a time indicates either a shortcircuit of solenoid valve 5, or an abnormally low resistance value, or a shortcircuit on the power supply positive line of connection 13.

Too long a time indicates a break in solenoid valve 5, or a break in its connections 11 or 13, or a shortcircuit to ground of one or two connections 11 and 13 just before fuse 2 melts, or a break between terminals 14 and 18 of control device 9. It should be noted that the speed of detection is greater the shorter the activation/deactivation cycle of solenoid valve 5 ($T_A + T_D$).

Of course, numerous variants to the embodiment described can be envisaged without thereby going outside the scope of the invention. For example, there can be cited either the modification of the connecting of the solenoid valve (for example, direct electrical connection to the power supply negative line of the vehicle), or the use of such a principle to control any self-induction device such as a pickup or actuator having the feature, or else operating under pulsed voltage, or else having the possibility without interfering with their action of being momentarily interrupted in their operation to apply to them a voltage step to control their operation by using the principle which is the object of this invention.

I claim:

1. A safety control device for an actuator having a solenoid valve, comprising:
    a current control device for controlling the current to said solenoid valve;
    a shunt resistor connected to said current control device for measuring the current to said solenoid valve;
    a control package connected to said current control device and said shunt resistor for measuring the time between the start of power to the solenoid valve and the moment when the current reaches a threshold intensity, said control package comparing said time with a time range $T_S \pm \Delta T$ which indicates the proper operation of the solenoid valve so that, if said time falls outside said time range, said control package controls said current control device to cut off power to said solenoid valve.

2. A safety control device according to claim 1, wherein a fuse is placed on the positive power line to protect the solenoid valve and the conductors joining the solenoid valve to the safety control device from a short circuit.

3. A safety control device according to claim 1, wherein when said time falls outside said time range, the control package sets a diagnostic connection to one of three possible states, corresponding to an operating anomaly.

4. A safety control device according to claim 1, further comprising a diode in the positive power line to protect against polarity inversions.

5. A safety control device according to claim 1, further comprising a diode connected in parallel with said solenoid valve to protect the current control device from surge voltage caused by the self-inductance of the solenoid valve.

6. A safety control device according to claim 1, wherein one end of said shunt resistor is connected to said current control device and the other end to ground.

7. A safety control device according to claim 1, wherein the current flows serially through said solenoid valve, said current control device and said shunt resistor to ground.

* * * * *